United States Patent [19]

Koyama et al.

[11] Patent Number: 4,699,493
[45] Date of Patent: Oct. 13, 1987

[54] FOCUS DETECTING DEVICE

[75] Inventors: Takeshi Koyama; Keiji Ohtaka, both of Tokyo, Japan

[73] Assignee: Canon Kabushiki Kaisha, Tokyo, Japan

[21] Appl. No.: 907,588

[22] Filed: Sep. 15, 1986

[30] Foreign Application Priority Data

Sep. 21, 1985 [JP] Japan ................................ 60-209442

[51] Int. Cl.$^4$ ........................... G03B 3/00; G01J 1/20
[52] U.S. Cl. ..................................... 354/406; 250/201
[58] Field of Search ............... 354/402, 406, 407, 408; 250/201, 204, 578

[56] References Cited

U.S. PATENT DOCUMENTS 4,634,255  1/1987  Suda et al. ........................... 354/406

Primary Examiner—W. B. Perkey
Attorney, Agent, or Firm—Fitzpatrick, Cella, Harper & Scinto

[57] ABSTRACT

A device for detecting the focused state of an objective lens comprises a re-imaging lens unit arranged to distribute light from a primary image formed by the objective lens to form secondary images which have their relative positions varying with the focused state of the objective lens, the re-imaging lens unit including a plurality of re-imaging lenses having a plurality of lens surfaces; and sensing means arranged to sense the light distributions made for the secondary images and to produce signals to be used in computing information on the focused state of the objective lens according to the relative positional relation between light distributions for the secondary images, the sensing means having a plurality of photosensors. In detecting the focused state of the objective lens, the optical axis of at least one of the lens surfaces of each of the re-imaging lenses is decentered relative to other lens surfaces in parallel with the direction in which the photosensors are arrayed.

7 Claims, 9 Drawing Figures

FOCUS DETECTING DEVICE

BACKGROUND OF THE INVENTION

1. Field of the Invention:

This invention relates to a focus detecting device adapted for a photographic camera, a video camera or the like and more particularly to a focus detecting device arranged to have the pupil of an image forming lens into two regions, to form two secondary object images by light fluxes passing through these regions and to detect the focal position of the image-forming lens by detecting the relative positional relation between these secondary object images.

2. Description of the Related Art:

The conventional relatively accurate passive type focus detecting methods include a method called the image displacement method. An example of this method was proposed in Japanese Laid-Open Patent Appication No. SHO 55-155331. The optical system disclosed in that publication is as follows: Referring to FIG. 1 of accompanying drawings, the illustration includes an image-forming lens 1 which is something like the objective lens of a camera; an exit pupil 11 of the image-forming lens 1; a predetermined imaging plane 2 for the image-forming lens; a field lens 3; a pair of stops 8a and 8b symmetrically arranged relative to the optical axis X of the image-forming lens 1; a pair of re-imaging lenses 4 and 5 which are also symmetrically arranged relative to the optical axis X in the rear of the stops 8a and 8b; and light receiving devices 6 and 7 disposed near to the imaging planes of the re-imaging lenses 4 and 5. Each of the devices 6 and 7 consists of a plurality of light receiving photosensitive elements. The pair of light receiving devices may be replaced with one long piece of such a device. The field lens 3 is arranged to have the stops 8a and 8b in a conjugate relation to the exit pupil 11. This arrangement substantially divides the exit pupil 11 into two regions 1a and 1b. A light flux passing through the region 1a of the exit pupil 11 of the image-forming lens 1 forms a primary object image near to the predetermined imaging plane 2. After this, the light flux is caused through the field lens 3 by the re-imaging lens 4 to form a secondary object image on the surface of the light receiving device 6. Meanwhile, another light flux which passes through the opposite region 1b of the exit pupil 11 of the image-forming lens 1 likewise forms another secondary object image on the surface of the other light receiving device 7.

The position in which a primary object image is formed by the image-forming lens 1 (or a defocus degree) relative to the position of the secondary object images is univocally determined. In the image displacement method, the focus detecting operation is carried out by detecting the positional relation between the two secondary object images. Therefore, the secondary object image forming performance on the surfaces of the two light receiving devices 6 and 7 is greatly dependent upon focus detecting accuracy. Assuming that an on-axial point on an object O is P and an off-axial point on the object is Q, when a primary object image is formed on the predetermined imaging plane 2, the two points P and Q become P' and Q'. Next, with the primary image re-imaged by the reimaging lenses 4 and 5 on the light receiving devices 6 and 7, the points P' becomes p" and P''' while the other point Q' becomes Q" and Q''' respectively. Considering now the point Q', while the point Q' is located straight in front of the lens 5, it is located obliquely in front of the other lens 4. In other words, in photographing the point Q', the phototaking angle of view of the lens 4 differs from that of the lens 5 thus diving different imaging conditions. More specifically, due to the influence of the distortion, chromatic aberration, etc. of the re-imaging lenses 4 and 5, a distance Z1 between the points P" and Q" and a distance Z2 between the points P''' and Q''' do not coincide with each other even when the image-forming lens 1 is in an in-focus state. The same problem also exists with respect to other points on the object O such as a point R, for example. A distance Z3 between points R" and P" and a distance Z4 between points R''' and P''' on the light receiving devices 6 and 7 do not coincide with each other. In the case of FIG. 1, distances Z1 and Z4 are equal and distances Z2 and Z3 also equal to each other.

In the conventional focus detecting method described, two images are arranged to electrically overlap each other by correlating signals relative to images of points Q" and R" with signals relative to images of points Q''' and R'''. However, with the uneven distortions arising in the images as mentioned above, the two images fail to precisely coincide with each other. In other words, while the point P" should coincide with the point P''' with the point Q" coinciding with the point Q''', the condition of Z1 ≠ Z2 prevents the points P" and P''' from coinciding with each other. This has been lowering the accuracy of focus detection.

SUMMARY OF THE INVENTION

It is an object of this invention to improve the focus detecting accuracy of a focus detecting device which is arranged to detect a focused state on the basis of positional deviation of object images relative to each other.

It is another object of this invention to improve the focus detecting accuracy of a focus detecting device by lessening a decrease in the imaging performance of re-imaging lenses due to their aberrations.

These and further objects and features of this invention will become apparent from the following detailed description of embodiments thereof taken in connection with the accompanying drawings.

DETAILED DESCRIPTION OF THE PREFERRED EMBODIMENTS

Figure 1:
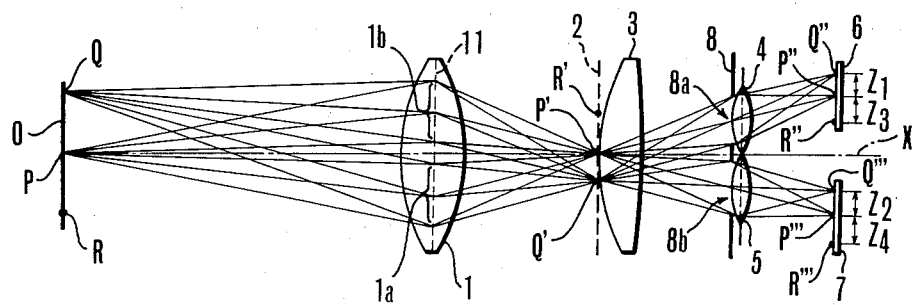
FIG. 1 is a sectional view showing a distance between one point and another in an optical system arranged according to the prior art.
Figure 2:
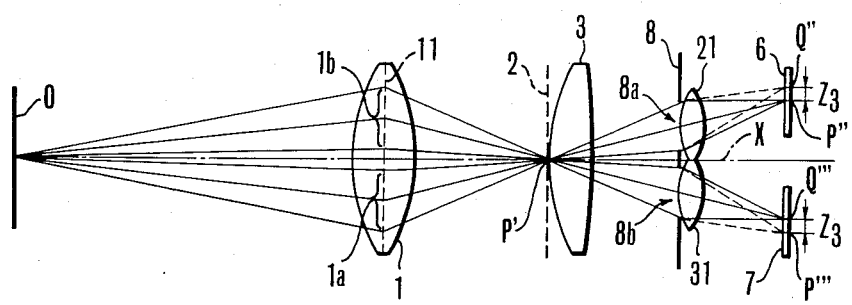
FIG. 2 is a sectional view showing an optical system arranged as an embodiment of this invention.
Figure 3:
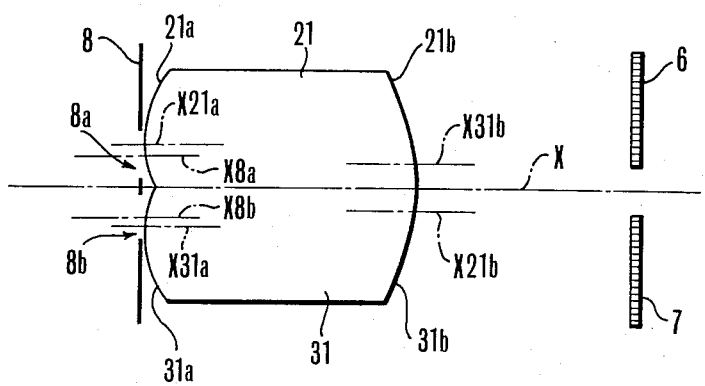
FIG. 3 is an enlarged sectional view showing a component member of FIG. 2.
Figure 4:
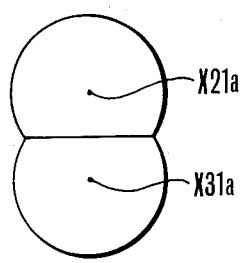
FIG. 4 is a front view of FIG. 3.

Referring to FIG. 2 and subsequent drawings, an embodiment is arranged as follows: In FIG. 2, the same members as those shown in FIG. 1 are indicated by the same reference numerals. This embodiment is characterized by a pair of re-imaging lenses 21 and 31. Although these lenses 21 and 31 are only schematically shown in FIG. 2, they are in actuality arranged in a form as shown in FIG. 3. The pair of re-imaging lenses 21 and 31 are arranged in one body for the purpose of facilitating a plastic injection molding process and assembly work thereon. However, they may be of course arranged separately from each other. FIG. 4 shows this lens pair of FIG. 3 as viewed from the left-hand side thereof. In FIG. 3, an optical axis X is shown as a boundary between the re-imaging lenses 21 and 31. These lenses have front lens surfaces 21a and 31a. These lens surfaces have optical axes X21a and X31a which extend through the spherical centers of the lens surfaces and are in parallel with the optical axis X. The lenses 21 and 31 also have rear lens surfaces 21b and 31b which have optical axes X21b and X31b extending through the spherical centers of the lens surfaces in parallel with the optical axis X. The optical axes X21a and X21b of the front lens surface 21a and the rear lens surface 21b of the re-imaging lens 21 are deviating from each other in the direction in which the photosensors of a light receiving device 6 are arrayed. The optical axes X31a and X31b of the front and rear lens surfaces 31a and 31b of the other re-imaging lens 31 are also deviating from each other in the same manner. The two re-imaging lenses 21 and 31 are symmetrically positioned or displaced relative to the optical axis X. Assuming that the axes of apertures of stops 8a and 8b are X8a and X8b, these axes X8a and X8b may be further displaced from the optical axes X21a and X31a of the front lens surfaces. In that instance, the axis X8a is displaced from the optical axis X21a in the same direction as the optical axis X21b of the rear lens surface 21b. A distance between the axis X8a and the optical axis X21a is smaller than a distance between the axis X8b and the optical axis X21b.

Figure 5:
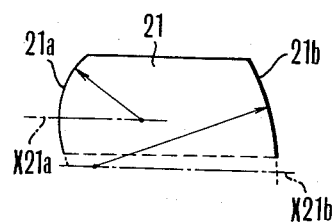
FIG. 5 is a sectional view of the same component member.
Figure 6:
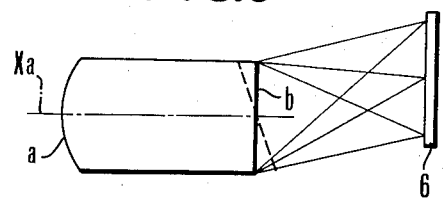
FIG. 6 is an illustration of the operation of the embodiment.

FIG. 5 shows only one of the re-imaging lenses of FIG. 3, i.e. the lens 21. As shown, the optical axis X21b of the rear lens surface 21b is eccentric relative to the optical axis X21a of the front lens surface 21a. The meaning of this eccentricity is as follows: Referring to FIG. 6, a front lens surface "a" has an optical axis Xa. This front lens surface "a" is assumed to have a composite power obtained from the refractive powers of the front and rear lens surfaces of the re-imaging lens 21 of FIG. 5 and a rear lens surface "b" to have no power, i.e. to be a plane surface. Even in the case of a lens which is in the form as shown in FIG. 6, there still arises some distortion that prevents the distances Z1 and Z3 (shown in FIG. 1) from becoming equal to each other. This problem can be solved by tilting the rear lens surface "b" on an axial point, for example, as shown by a broken line in FIG. 6. Then, with a part of the power of the front lens surface "a" imparted to the tilted rear surface, the lens comes to have a shape as shown in FIG. 5. In other words, the rear lens surface 21b is arranged to have a slanting spherical surface, which has an eccentric optical axis relative to the other lens surface.

In this embodiment, a light flux which passes through one (1a) of the divided regions of the exit pupil 11 of the image-forming lens 1 forms a primary object image near to a predetermined imaging plane 2 in the same manner as in the case of FIG. 1. After that, the light flux is caused by the re-imaging lens 21 through the field lens 3 to form a secondary object image on the surface of the light receiving device 6. Then, in the case of this embodiment, the rear lens surface 21b of the re-imaging lens 21 is decentered relative to the front lens surface 21a in parallel with the photosensor arraying direction of the light receiving device 6. As a result of this arrangement, the light flux is subjected to the convergent and prismatic actions of the lens surface 21b which are similar to those of the other lens surface 21a.

Meanwhile, another light flux which passes through the other region 1b of the exit pupil 11 of the image-forming lens 1 also undergoes the same actions.

The dimensional errors of the secondary object images are thus forcedly corrected.

In accordance with the arrangement of this embodiment, one of the lens surfaces of each re-imaging lens is decentered in parallel relative to the other lens surface to obtain a prismatic effect. This arrangement effectively lessens the dimensional errors (such as Z1-Z2) of the secondary object images resulting from the aberrations of the re-imaging lenses. The lens surface to be decentered according to this invention may be any of the lens surfaces of the re-imaging lenses. In cases where a plurality of re-imaging lenses are to be used, a plurality of lens surfaces may be decentered relative to other lens surfaces in the photosensor arraying direction.

Figure 8:
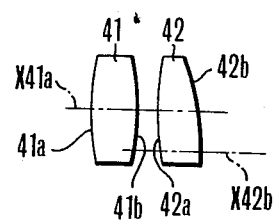
FIGS. 8 and 9 are partial sectional views of modification examples.
Figure 9:
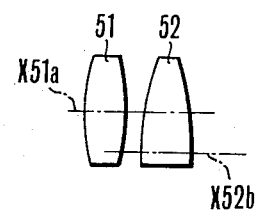

FIG. 8 shows a modification example in which the re-imaging lens of FIG. 5 is replaced with two lens elements 41 and 42. Three lens surfaces 41a, 41b and 42a are arranged to have one optical axis X41a in common while another lens surface 42b is arranged to have a decentered optical axis X42b. FIG. 9 shows another modification example, wherein one of two lenses 51 and 52 is arranged to have its optical axis decentered relative to the other. In this case, two lens surfaces are decentered in parallel relative to other lens surfaces.

The following shows a numerical example, wherein the re-imaging lens according to this invention is normalized to be of a focal length $f = 1$:

|   | R      | D     | N       | ν    |
|---|--------|-------|---------|------|
| 1 | 0.542  | 1.042 | 1.49171 | 57.4 |
| 2 | -1.875 |       |         |      |

In the table above, R1 and R2 represent radiuses of curvature of the lens surfaces on the side of an object and on the side of an image of the object; D1 represents lens thickness; and N1 and ν1 respectively represent the refractive index of the material employed and an Abbe number. The distance between the apertures of the stops 8a and 8b is 0.248. The distances between the optical axes of the lens surfaces on the object and image sides of the re-imaging lenses 21 and 31 are 0.35 and -0.17 respectively. The image forming magnification of the re-imaging lenses 21 and 31 is 0.35. These lenses 21 and 31 are made of an acrylic resin material. In the case of this embodiment, assuming that the primary object image measures 0.42mm size from the optical axis, the dimensional error Z1-Z2 between the two secondary object images due to various aberrations is 0.063μm; and the dimensional error between d and g lines due to chromatic aberration is 0.042μm.

Figure 7:
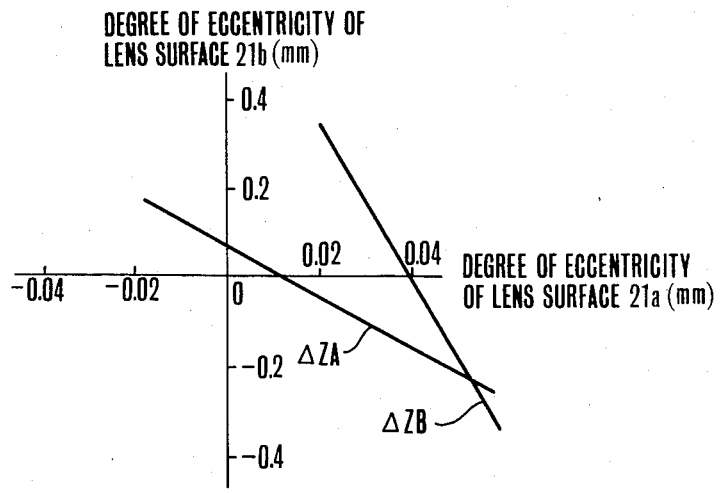
FIG. 7 is a graph showing the degree of eccentricity of lens surfaces due to chromatic aberration.

FIG. 7 shows in a graph a straight line ΔZA representing a condition satisfying ΔZA = Z1-Z2 = 0 and a straight line ΔZB representing a condition wherein the dimensional error due to chromatic aberration ΔZB is 0 with the degrees of eccentricity of the lens surfaces 21a and 21b from the center of the aperture of the stop 8a taken on the axes of the graph. In this specific embodiment, a degree of eccentricity in the proximity of a crossing point of straight lines ΔZA and ΔZB is employed.

In accordance with this invention, at least one of the lens surfaces of each of the re-imaging lenses is decentered to obtain a prismatic effect. By virtue of this arrangement, the distortion of the secondary object images due to the adverse effects of various aberrations including the chromatic aberration of the re-imaging lenses is corrected, so that a focus detecting device of the image displacement type can be arranged to accurately detect the focused state of an objective lens in accordance with this invention.

What is claimed is:

1. A device for detecting the focused state of an objective lens, comprising:
   a re-imaging lens unit arranged to distribute light from a primary image formed by said objective lens to form secondary images which have their relative positions varying with the focused state of said objective lens, said re-imaging lens unit including a plurality of re-imaging lenses having a plurality of lens surfaces; and
   sensing means arranged to sense the light distributions in relation to the secondary images and to produce signals to be used in computing information on the focused state of said objective lens according to the relative positional relation between said light distributions in relation to said secondary images, said sensing means having a plurality of photosensors, and
   wherein, an optical axis of at least one of the lens surfaces of each of said re-imaging lenses deviates from that of another lens surface in the direction in which said photosensors are arrayed, wherein said deviations are symmetrical about an axis of the re-imaging lens unit.

2. A device according to claim 1, further comprising a stop having apertures arranged close to said re-imaging lens unit and facing said re-imaging lenses in such a way as to have their axes which extend through the centers of said apertures deviate in parallel from the optical axes of the lens surfaces of said re-imaging lenses.

3. A device according to claim 2, wherein said stop is disposed on the object side of said re-imaging lens unit.

4. A device according to claim 2, wherein said axes extending through the centers of said apertures are located inside the optical axes of the lens surfaces of said re-imaging lenses.

5. A device according to claim 1, further comprising a stop having apertures arranged on the object side of said re-imaging lens unit to be opposed to said re-imaging lenses, and wherein each of said re-imaging lenses has two lens surfaces; and a distance between the optical axis of the front lens surface of each re-imaging lens and the axis of the aperture opposed to said re-imaging lens is smaller than the distance between the optical axis of the rear lens surface of said lens and the axis of said aperture.

6. A device according to claim 1, wherein each of said re-imaging lenses has two convex lens surfaces and these re-imaging lenses are formed in one unified body by molding.

7. A device according to claim 1, wherein each of said re-imaging lenses includes a plurality of lens elements.

* * * * *